US 8,876,647 B2

(12) United States Patent
Gallet et al.

(10) Patent No.: US 8,876,647 B2
(45) Date of Patent: Nov. 4, 2014

(54) DEVICE FOR LUBRICATING AN EPICYCLOIDAL REDUCTION GEAR

(71) Applicant: SNECMA, Paris (FR)

(72) Inventors: Francois Gallet, Paris (FR); Boris Briantais, Lieusaint (FR); Jean-Pierre Serey, Paris (FR); Alexandre Tan-Kim, Laon (FR)

(73) Assignee: SNECMA, Paris (FR)

( * ) Notice: Subject to any disclaimer, the term of this patent is extended or adjusted under 35 U.S.C. 154(b) by 17 days.

(21) Appl. No.: 13/773,811

(22) Filed: Feb. 22, 2013

(65) Prior Publication Data

US 2013/0225353 A1 Aug. 29, 2013

(51) Int. Cl.
*F16H 57/04* (2010.01)
*F01D 25/18* (2006.01)

(52) U.S. Cl.
CPC .... *F16H 57/042* (2013.01); *F05D 2260/40311* (2013.01); *F01D 25/18* (2013.01); *F16H 57/0479* (2013.01); *F16H 57/0456* (2013.01); *F05D 2260/98* (2013.01); *Y02T 50/671* (2013.01); *F16H 57/0423* (2013.01); *F16H 57/0486* (2013.01)
USPC .......................................... 475/159; 184/6.12

(58) Field of Classification Search
USPC .......................................... 475/159; 184/6.12
See application file for complete search history.

(56) References Cited

U.S. PATENT DOCUMENTS

| 4,271,928 | A | * | 6/1981 | Northern ...................... 184/6.4 |
| 4,429,587 | A | * | 2/1984 | Finn et al. ...................... 74/467 |
| 5,107,676 | A |   | 4/1992 | Hadaway et al. |
| 5,472,383 | A | * | 12/1995 | McKibbin ...................... 475/159 |
| 6,223,616 | B1 |   | 5/2001 | Sheridan |
| 8,205,432 | B2 | * | 6/2012 | Sheridan ...................... 60/226.3 |
| 2009/0247347 | A1 |   | 10/2009 | Choi |
| 2011/0299974 | A1 |   | 12/2011 | Gauthier et al. |
| 2011/0305575 | A1 | * | 12/2011 | Balk et al. ................. 416/170 R |
| 2012/0157256 | A1 | * | 6/2012 | Takeuchi et al. .............. 475/159 |

FOREIGN PATENT DOCUMENTS

| DE | 1 985 822 | 5/1968 |
| JP | 2-84053 | 6/1990 |
| JP | 11-210867 | 8/1999 |
| WO | 2010/092263 A1 | 8/2010 |

OTHER PUBLICATIONS

U.S. Appl. No. 13/904,483, filed May 29, 2013, Gallet.
French Preliminary Search Report issued Oct. 10, 2012, in Patent Application No. FR 1251654, filed Feb. 23, 2012 (with English Translation of Category of Cited Documents).

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

A reduction gear includes a sun pinion and planet pinions driven by the sun pinion and rolling on a fixed ring gear. The device includes an oil tank, an oil supply duct and oil routing ducts. The device also includes an oil ejection device at the end of the fixed supply duct, the orientation of which includes a radial component directed away from a common axis of rotation, and a cylindrical device for recovering the oil that can move in rotation about the common axis of rotation. The oil ejection device is linked by at least one duct to a lubrication device for the gear formed by the cooperation of the teeth of at least one planet pinion with an adjacent pinion. This device feeds the ducts which supply the oil to the parts to be lubricated, by virtue of the action of the centrifugal field.

9 Claims, 4 Drawing Sheets

DEVICE FOR LUBRICATING AN EPICYCLOIDAL REDUCTION GEAR

BACKGROUND OF THE INVENTION

1. Field of the Invention

The field of the invention is that of aeronautical propulsion and more particularly turbojet engines with high dilution rates, or turbofans.

2. Description of the Related Art

Modern turbomachines are conventionally produced in the form of an assembly of modules which can include fixed parts and moving parts. A module is defined as a subassembly of a turbomachine which exhibits geometrical characteristics at its interfaces with the adjacent modules that are sufficiently precise for it to be able to be shipped individually and which has undergone a particular balancing when it includes rotating parts. The modules are assembled to form a complete engine, minimizing the operations of balancing and of the matching interfaced parts.

The current turbofans comprise a number of compressor stages, notably a low-pressure (BP) and a high-pressure (HP) compressor which belong to the primary core of the engine. Upstream of the low-pressure compressor, there is a wheel of large moving blades or fan, which feeds both the primary flow which passes through the BP and HP compressors and the cold flow, or secondary flow, which is directed to a cold flow nozzle, called secondary nozzle. The fan is driven by the rotation shaft of the BP core and generally rotates at the same speed. It may, however, be advantageous to have the fan rotate at a rotation speed less than that of the BP shaft, particularly when the latter is of very large size, in order to better adapt it aerodynamically. For this, a reduction gear is positioned between the BP shaft and a fan shaft, which bears the fan. The fan, the fan shaft and the reduction gear generally form part of one and the same module, called fan module.

One of the problems encountered with the reduction gears on turbofans is that they require high oil flow rates, which can be as high as 6 to 7000 l/h on take-off, to ensure their lubrication and the cooling of their pinions and main bearings. To limit the losses by churning, it is necessary to bring the oil precisely to the required places, then evacuate it as soon as its lubrication action has been performed.

Among the types of reduction gears used, there are reduction gears with epicycloidal gear trains, which have the advantage of offering high rotation speed reduction rates, in small footprints. On the other hand, they have the drawback of having planet pinions which move by rotating about the axis of rotation of the reduction gear drive shaft. It is therefore essential to devise devices for supplying the oil, which comes from an oil tank and a lubrication pump situated at fixed coordinates, to these pinions which are situated at moving coordinates. To resolve this problem, the devices commonly used comprise systems of rotating seals, produced from segments which rotate while rubbing against the fixed parts and which ensure the seal-tightness between the fixed parts and the moving parts of the reduction gear.

These systems nevertheless have the drawbacks of a consequential footprint and a wear which is incompatible with the lifetimes demanded of aeronautical engines. They also exhibit risks of failures which would give rise to an interruption of the oil feed, which is not acceptable given the potentially catastrophic consequences of an engine stopping in flight as a result of a jamming of its reduction gear. Finally, it is difficult to make these reduction gears compatible with a flexible installation on the structure of the engine, which is recommended to mitigate the risk of loss or rupture of a fan blade, or even with an installation of modular type to facilitate the assembly of an engine.

BRIEF SUMMARY OF THE INVENTION

The aim of the present invention is to remedy these drawbacks by proposing a turbojet reduction gear oil feed device with moving pinions and with fixed ring gear, which is capable of lubricating the gear between the sun pinion and the planet pinions, and/or the gear between the planet pinions and the external ring gear.

To this end, the subject of the invention is a reduction gear with epicycloidal gear train equipped with an oil feed device, said reduction gear comprising a sun pinion that can move in rotation about a common axis of rotation, planet pinions borne by a planet carrier, the planet pinions being driven by said sun pinion and being able to move in rotation about planet axes, said planet pinions rolling on a fixed ring gear, said device comprising an oil tank situated above said axis of rotation, at least one fixed oil supply duct at the level of said assembly and oil routing ducts at the level of the rotating gears, said routing ducts also being able to move in rotation about the common axis of rotation, said device also comprising an oil ejection means at the end of the fixed supply duct, the orientation of which includes a radial component directed away from the common axis of rotation, and a cylindrical means for recovering the oil that can move in rotation about said common axis of rotation and positioned facing said ejection means, characterized in that said oil ejection means is linked by at least one duct to a lubrication means for the gear formed by the cooperation of the teeth of at least one planet pinion with an adjacent pinion.

Since the ring gear of the reduction gear is fixed, it can be used for a flexible installation in a turbojet. Also, such a device makes it possible to transfer the lubrication oil from the fixed coordinates of the tank and the supply ducts, into the moving coordinates of the pinions without having to use a means of the rotating seal type.

Advantageously, the bottom of the recovery means is situated radially at a distance from the common axis of rotation which is less than that from the gears of the pinions and from the main bearings of the planet axes so that the latter are fed with oil from said means under the action of centrifugal forces.

In a particular embodiment, the recovery means is linked by at least one first duct to a cavity internal to one of the planet pinions, said cavity being linked to the bearing of the corresponding planet carrier axis by at least one channel oriented radially to guide the oil, under the action of centrifugal forces, from said cavity to said bearing.

In another particular embodiment, said lubrication means is a second duct with a gear lubrication spray boom for the gear formed by the cooperation of the teeth of the sun pinion and of at least one planet pinion.

In yet another embodiment, said lubrication means is a lubrication sprinkler for the gear formed by the cooperation of the teeth of the ring gear and of at least one planet pinion. Preferentially, the teeth of the planet pinion are oriented diagonally between their point situated facing said sprinkler and the periphery of said planet pinion.

Even more preferentially, said sprinkler is positioned on the output side of the corresponding gear.

The invention also relates to a fan module of a turbofan engine comprising a fan shaft driven by a reduction gear as defined above and finally to a turbofan engine comprising such a fan module.

BRIEF DESCRIPTION OF THE SEVERAL VIEWS OF THE DRAWINGS

The invention will be better understood, and other aims, details, features and advantages thereof will become more clearly apparent from the following detailed explanatory description, of an embodiment of the invention given as a purely illustrative and nonlimiting example, with reference to the appended schematic drawings.

In these drawings.

DETAILED DESCRIPTION OF THE INVENTION

Figure 1:
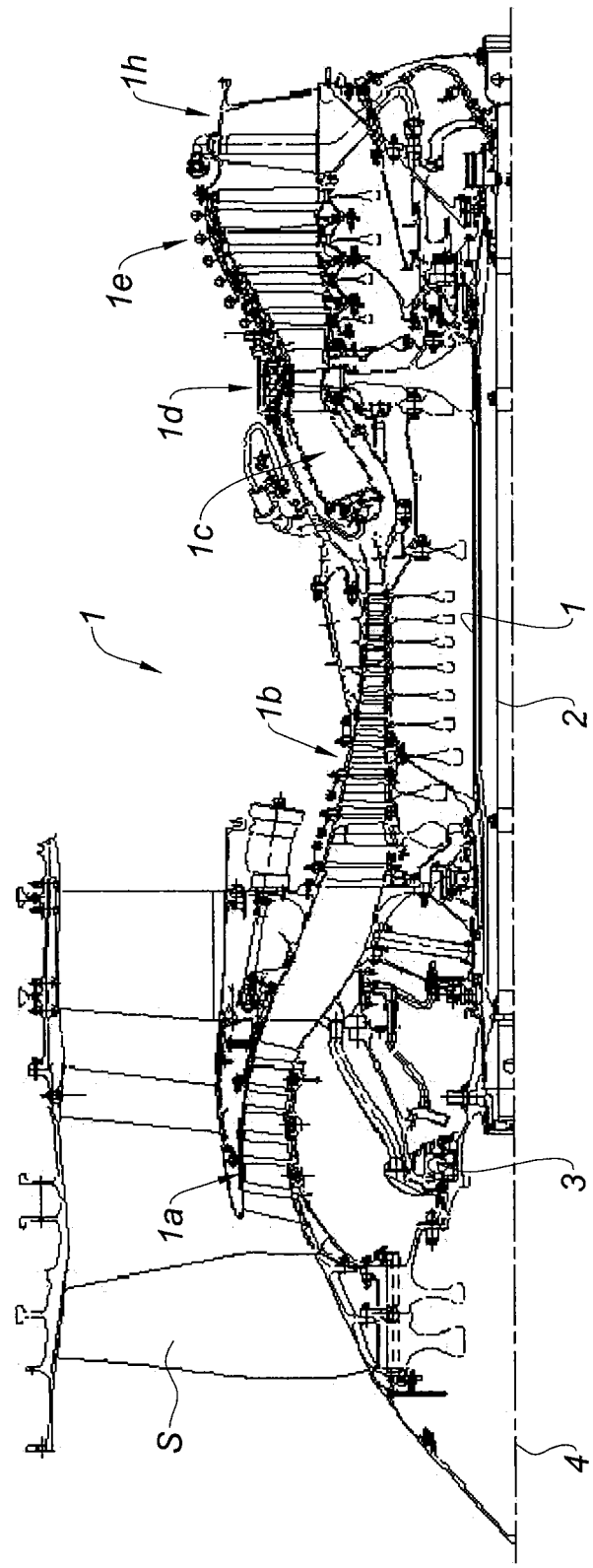
FIG. 1 is a general view of a turbofan engine with high dilution rate.

By referring to FIG. 1, a turbojet 1 can be seen which comprises, conventionally, a fan S, a low-pressure compressor 1a, a high-pressure compressor 1b, a combustion chamber 1c, a high-pressure turbine 1d, a low-pressure turbine 1e and an exhaust nozzle 1h. The high-pressure compressor 1b and the high-pressure turbine 1d are linked by a high-pressure shaft 1 and form with it a high-pressure (HP) core. The low-pressure compressor 1a and the low-pressure turbine 1e are linked by a low-pressure shaft 2 and form with it a low-pressure (BP) core.

In the configuration represented which relates to a conventional turbofan, without reduction gear, the disc on which the blades of the fan S are mounted is driven by a fan shaft 3, or BP journal, which is itself driven directly by the BP shaft 2. In the invention represented in FIGS. 2 to 6, the fan shaft 3 is driven by the BP shaft 2 through a reduction gear 10 with epicycloidal gear train.

Figure 2:
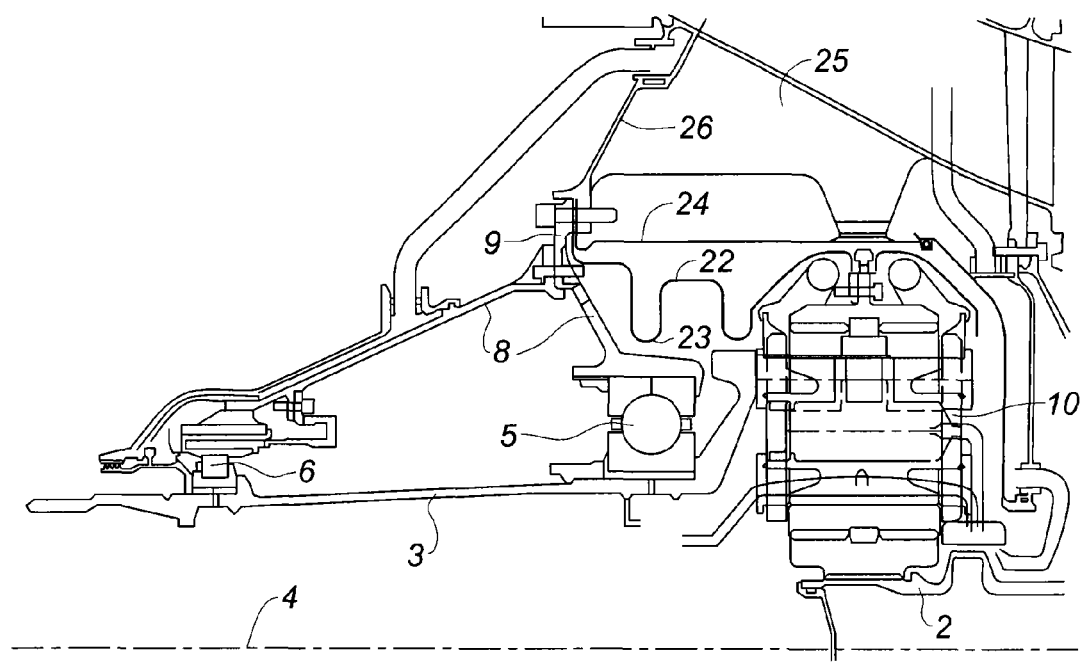
FIG. 2 is a detailed view showing the integration, in a turbofan, of a fan shaft rotation speed reduction gear, with epicycloidal gear train.

FIG. 2 shows the positioning of the reduction gear 10 in the front part of the turbojet 1. The blades of the fan S are borne by the fan shaft 3 which is linked to the structure of the engine via a ball bearing 5 which transmits the thrust forces and a roller bearing 6 which allows the longitudinal expansions of the fan shaft. The main bearings of these two bearings are fastened to one or more parts forming a support for the fan shaft 8, which is attached to the structure of the turbojet at a flange supporting the fan module 9. The fan shaft 3, which belongs, with the support piece 8, the fan blades S and the two bearings 5 and 6 to the fan module 9, is fastened at its downstream end to the planet carrier 13 of the reduction gear 10. On its side, the BP shaft 2 is linked to the sun gear 11 of the reduction gear 10 by its splines 7, as explained later with reference to FIG. 3. The reduction gear 10 is fastened, via sealing and support flanges 20 which extend radially from the ring gear of the epicycloidal gear train, to one of the ends of support casing 22, which thus ensures that the reduction gear is held in place on the fan shaft 3 and its position relative to the BP shaft 2. The other end of the support casing 22 is fastened to the structure of the turbojet, on an attachment flange 26 of the fan module, which extends radially from a structural part of the turbojet, or supporting casing 25. The support casing 22 is cylindrical and comprises, on its longitudinal extension, axial corrugations 23, two of which are represented, in order to give a certain radial flexibility and ensure a flexible installation for the reduction gear. Such a degree of freedom avoids having the latter flange mounted on the structure and having it undergo significant stresses during the vibrations or movements by expansion of the various constituent elements of the turbojet. A gap J is left circumferentially around the ring gear to enable the reduction gear to move radially without interfering with the structure of the turbojet. This gap is dimensioned to allow the reduction gear to float in its casing in normal conditions and be used up only in case of loss or rupture of a blade of the fan. For this, the supporting structural casing 25, which comprises ribs against which the ring gear can abut if it moves radially by a value greater than the gap J, is arranged facing the external ring gear of the reduction gear 10. The supporting casing 25 takes up the forces generated by the supporting of this ring gear in the event of the rupture or loss of a fan blade. Between the support casing 22 and the supporting casing 25, there is a casing 24 for pressurizing the chamber of the reduction gear 10 to facilitate the evacuation of its lubrication oil. The purpose of this pressurization casing 24 is to create a chamber around the reduction gear which is at a pressure greater than that surrounding it, the latter being depressurized by an oil suction pump of the reduction gear 10. The connection of the oil recovery circuit of the reduction gear to this external chamber makes it possible to better evacuate the oil from the reduction 10 and thus avoid the churning phenomena. The pressurization casing thus comprises, at its downstream end, a groove in which an O-ring seal is positioned in order to ensure the seal-tightness of this chamber after the installation of the fan module on the structure of the engine.

Figure 3:
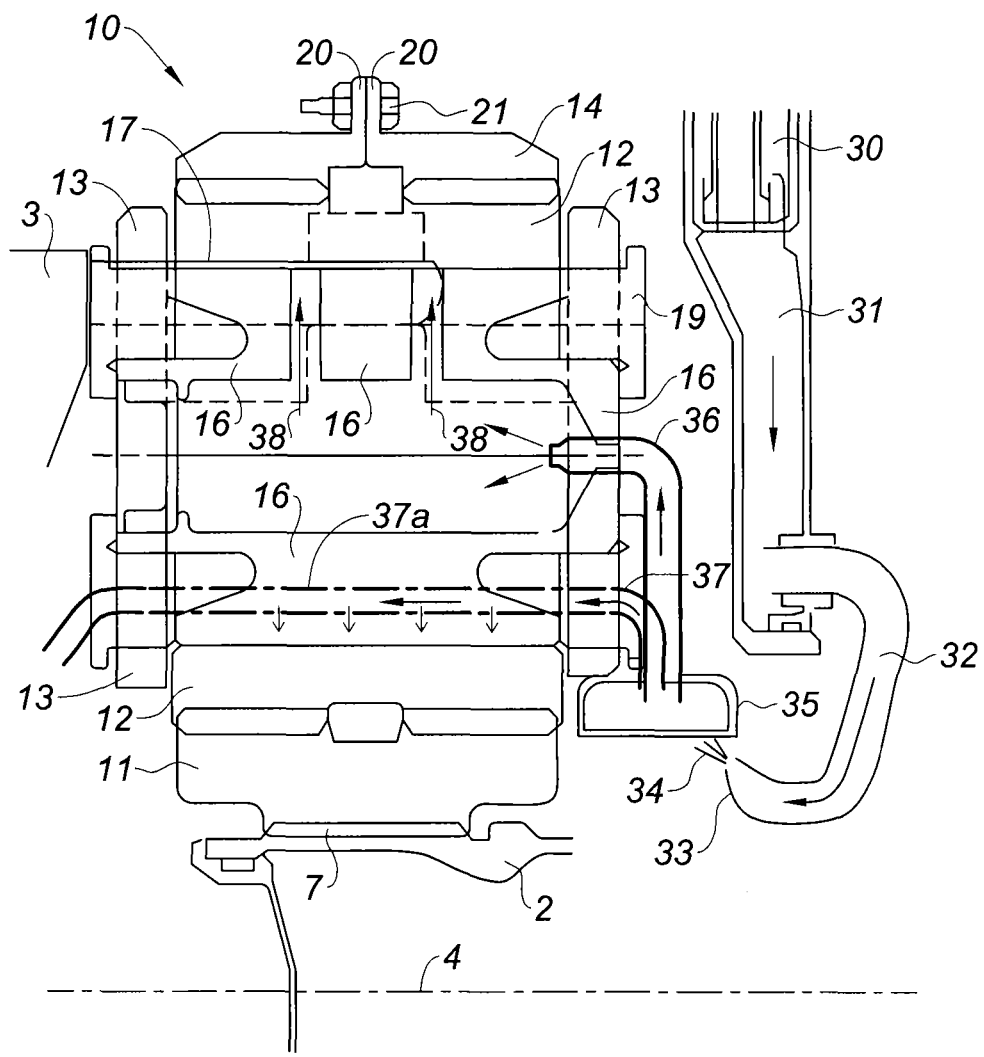
FIG. 3 is a detailed view of the reduction gear of FIG. 2, equipped with the lubrication system according to an embodiment of the invention.

FIG. 3 shows, in radial half-section, the top part of the reduction gear 10, the bottom part being situated symmetrically in relation to the axis of rotation 4 of the turbomachine, which appears at the bottom of the figure. The reduction gear 10 is enclosed externally in its ring gear 14, which is not able to move in rotation and which is fastened to the structure of the engine at the level of its sealing and fastening flanges 20. The ring gear 14 is in fact produced in two parts to allow all the constituent elements of the reduction gear to be put in place, and these two parts are attached to one another by a series of assembly bolts 21, at the level of the flanges 20 which extend radially from the ring gear. The corresponding end of the support casing 22 is, also, fastened to the sealing flanges 20 by the assembly bolts 21.

The reduction gear engages, on the one hand, on the splines 7 of the BP shaft 2 via the gear pinions of the sun pinion 11 of the epicycloidal gear train, and, on the other hand, on the fan shaft 3 which is attached to the planet carrier 13 of this same epicycloidal gear train. Conventionally, the sun pinion 11, the axis of rotation of which is the same as that 4 of the turbomachine, drives a series of planet pinions 12, which are distributed regularly on the circumference of the reduction gear. These planets 12 also rotate about the axis 4 of the turbomachine, by rolling on the ring gear 14 which is attached to the structure of the turbomachine by the support casing 22. At the centre of each planet, there is a planet axis 16 linked to a planet carrier 13, the planet rotating freely about this axis using a main bearing which can be smooth as represented in FIG. 3, or comprise a roller bearing in alternative configurations. The rotation of the planets about their planet axis 16, by virtue of the cooperation of their pinions with those of the ring gear 14, drives the rotation of the planet carrier 13 about the axis 4, and consequently that of the fan shaft 3 which is linked to it, at a rotation speed which is less than that of the BP shaft 2.

The driving of the fan shaft 3 by the planet carrier 13 is ensured by a series of centring fingers 17, distributed regularly over the circumference of the reduction gear, which extend axially from the downstream end of the fan shaft 3 and which are driven into bores formed in the planet carrier. The planet carrier 13 extends symmetrically on either side of the reduction gear to enclose the assembly and form a chamber, in which a lubrication function can be implemented. Bushes 19 complete the sealing of this chamber by blocking it at the planet axes 16, on each side of the reduction gear.

Figure 4:
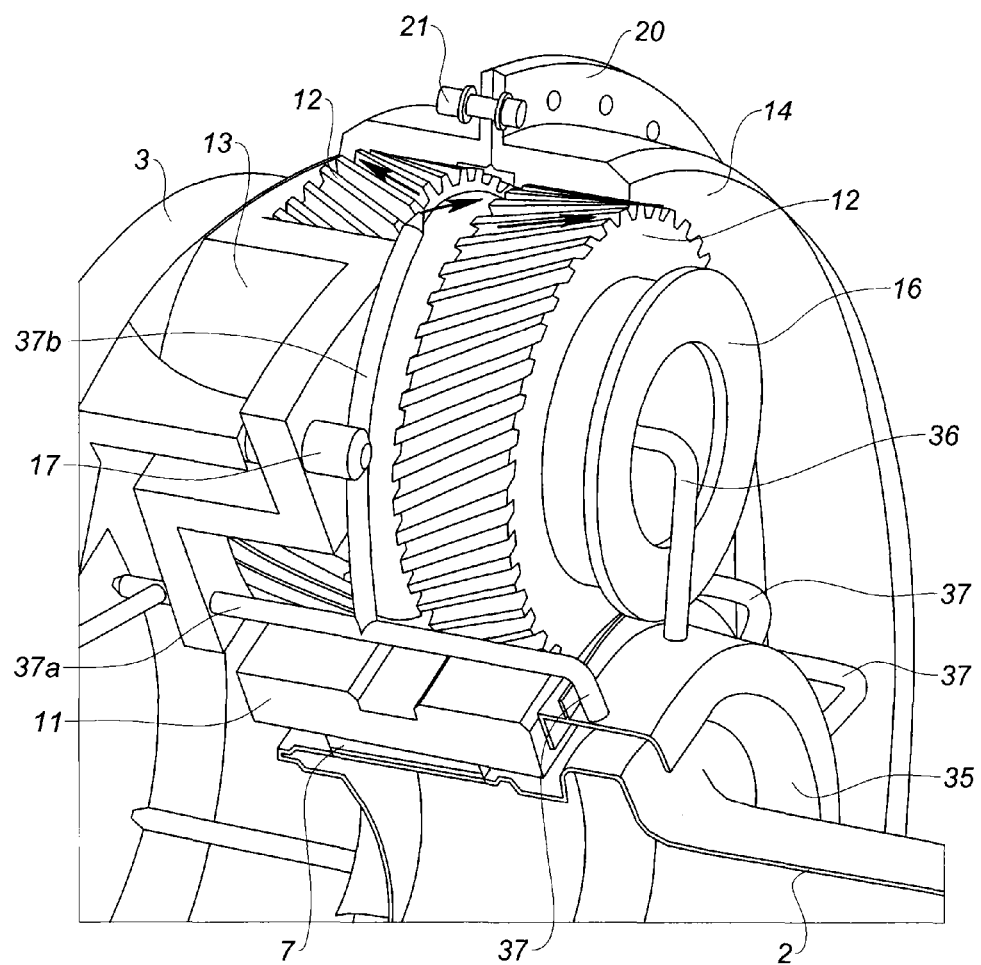
FIG. 4 is an exploded view, in perspective, of the reduction gear of FIG. 3.

FIG. 3 also shows, with FIG. 4, the routing of the lubrication oil to the reduction gear 10 and its routing therein. Arrows show, in FIG. 3, the route followed by the oil from a specific oil tank, called buffer tank 31, to the pinions and to the main bearings to be lubricated.

The buffer tank 31 is positioned alongside the reduction gear, in the top part, so that the oil can flow towards the centre of the reduction gear by gravity. This tank 31 is fed by a routing duct 30, from the main tank of the engine (not represented). The oil flows from the buffer tank 31, to end at an injector 32, the calibrated end of which is constricted to form a sprinkler 33. The oil leaves the sprinkler in the form of a jet 34, which is formed under the pressure produced jointly by the pressure of the feed pump and by the weight of the oil column situated above it. This jet 31 is oriented with a radial component directed towards the outside of the engine and ends in a cylindrical cup 35 with U-shaped radial section, in which the open end of the U is oriented towards the axis of rotation 4. Although the injector 32 and its sprinkler 33 are fixed, the cup 35 can move in rotation about the axis 4 and at all times presents a U-shaped part facing the sprinkler. Since the opening of the U-shaped bottom of the cup 35 is situated facing the axis of rotation 4 and the edges of the U are oriented towards this axis, the cup 35 forms an oil-retaining cavity, which ensures the reception of the oil from the jet 34. This oil is driven in rotation by the cup 35 in the bottom of which it is compressed under the action of the centrifugal force.

A series of ducts leaves from the bottom of the cup to feed oil to the various members to be lubricated. These ducts, as represented in FIGS. 3 and 4, are essentially of two types. A first series of ducts 36, which are regularly distributed over the periphery of the reduction gear and the number of which equals that of the planet pinions 12, leaves from the bottom of the cup 35 and enters into the internal chamber of each planet shaft 16, which is enclosed by the planet carrier 13. A second series of ducts 37, which are also distributed regularly over the periphery of the reduction gear, leaves from the bottom of the cup 35 to be directed into the space situated between two consecutive planet pinions 12.

The oil which circulates in the first ducts 36 enters into the internal cavity of each planet axis 16, then passes, by virtue of the centrifugal force, into guiding channels 38, which pass through these axes by being oriented radially. These channels 38 end at the periphery of the planet axes 16, at their main bearings supporting the planets 12 and thus ensure the lubrication of these main bearings.

The second ducts 37 run, from the bottom of the cup 35, between the planets 12 and are divided into a plurality of channels 37a, 37b which route the oil to the gears formed by, on the one hand, the pinions of the planets 12 and those of the sun gear 11 and, on the other hand, the pinions of the planets 12 and those of the ring gear 14. All of the main bearings and gears of the reduction gear 10 are thus lubricated by the oil which comes from the sprinkler 33 and which is collected by the cup 35 situated facing it. Each second duct 37a extends axially along the planet pinion, between the planet pinion 12 and the sun gear 11, and forms a lubrication spray boom over the entire width of the two pinions. The duct 37b, which feeds the gear between the ring gear 11 and the planets 12, sprays its oil to the centre of the cylinder formed by each planet. As represented, these are produced in the form of two series of parallel pinions. Their teeth are oriented diagonally in relation to the axis of rotation of the planet 12, so as to enable them to function as grooves in which the oil is driven, from the middle of the cylinder to its periphery, to lubricate the gear over its entire width.

There now follows a description of the operation of the lubrication circuit according to the invention.

The oil flows by gravity from the buffer tank 31 into the injector 32. Under the pressure of the feed pump and of the oil column situated above the sprinkler 33, the oil is ejected and is recovered by the rotating cup 35 into which it spills under the action of the field of centrifugal forces which prevails therein. It then passes into the first and second ducts 36 and 37 of each planet 12.

The oil which passes through the first duct 36 enters into the internal cavity of the corresponding planet pinion 12 and is then simultaneously subjected to the abovementioned field of centrifugal forces and to the field due to the rotation of the planet pinion about its planet axis 16. It passes through the thickness of the planet pinion 12 by virtue of the guiding channels 38 and lubricates the main bearing situated between the planet 12 and its planet axis 16. It should be noted that the centrifugal acceleration field gives rise to a pressure gradient along the pipe and that this gradient is translated into a sufficiently high pressure (approximately 5 bar) at the main bearing, to be able to feed it.

For its part, the oil which passes through the second duct 37, is divided between the second duct 37a feeding the sun gear and the second duct 37b feeding the planet-ring gears. The duct 37a ejects over the entire width of the two pinions by virtue of its lubrication spray boom. The duct 37b goes back up along the planet pinion to the level of its gear on the ring gear 14 and ends with a sprinkler which lubricates the latter. Preferably, the oil is sent over the teeth as they leave the gear mesh, so as to cool them immediately after they have been heated up. The diagonal orientation given to the teeth of the planet 13 causes the oil to flow from the middle of the pinion to the outside and therefore ensures a uniformly-distributed lubrication for all of this gear.

All of the main bearings and gears of the reduction gear, which for the most part can move in rotation about the axis of the turbojet, are thus lubricated from an oil feed network which is situated on the fixed part of this same turbojet.

The invention claimed is:

1. A reduction gear with epicycloidal gear train equipped with an oil feed device,
said reduction gear comprising:
a sun pinion that can move in rotation about a common axis of rotation, and
planet pinions borne by a planet carrier, the planet pinions being driven by said sun pinion and being able to move in rotation about planet axes, said planet pinions rolling on a fixed ring gear,
said device comprising:
an oil tank,
at least one fixed oil supply duct,
oil routing ducts, said routing ducts also being able to move in rotation about the common axis of rotation,
an oil ejection device at an end of the fixed supply duct, the orientation of which includes a radial component directed away from the common axis of rotation, and
a cylindrical recovery device for recovering the oil, the recovery device moving in rotation about said common axis of rotation and positioned facing said ejection device, wherein said oil ejection device is linked by at least one duct to a lubrication device for the gear formed by the cooperation of the teeth of at least one planet pinion with an adjacent pinion.

2. The reduction gear with epicycloidal gear train according to claim 1, wherein the bottom of the recovery device is situated radially at a distance from the common axis of rotation which is less than that from the gears of the pinions and from main bearings of the planet axes so that the main bearings are fed with oil from said recovery device under the action of centrifugal forces.

3. The reduction gear according to claim 2, wherein the recovery device is linked by at least one first duct to a cavity internal to one of the planet pinions, said cavity being linked to the bearing of the corresponding planet carrier axis by at least one channel oriented radially to guide the oil, under the action of centrifugal forces, from said cavity to said bearing.

4. The reduction gear according to claim 2, wherein said lubrication device is a lubrication spray boom for a gear formed by the cooperation of the teeth of the sun pinion and of at least one planet pinion.

5. The reduction gear according to claim 2, wherein said lubrication device is a lubrication sprinkler for the gear formed by the cooperation of the teeth of the ring gear and of at least one planet pinion.

6. The reduction gear according to claim 5, wherein teeth of the planet pinion are oriented diagonally.

7. The reduction gear according to claim 5, wherein said sprinkler is positioned on an output side of the corresponding gear.

8. A fan module comprising a fan shaft driven by a reduction gear according to claim 1.

9. A turbofan engine comprising a fan module according to claim 8.

* * * * *

UNITED STATES PATENT AND TRADEMARK OFFICE
CERTIFICATE OF CORRECTION

PATENT NO. : 8,876,647 B2  
APPLICATION NO. : 13/773811  
DATED : November 4, 2014  
INVENTOR(S) : Francois Gallet et al.

Page 1 of 1

It is certified that error appears in the above-identified patent and that said Letters Patent is hereby corrected as shown below:

Title Page, please add:

--(30) Foreign Application Priority Data

Feb. 23, 2012    (FR)................12 51654--.

Signed and Sealed this
Twenty-third Day of June, 2015

Michelle K. Lee
*Director of the United States Patent and Trademark Office*